(12) United States Patent
Heinze et al.

(10) Patent No.: US 7,274,294 B2
(45) Date of Patent: Sep. 25, 2007

(54) MOBILE LOCATOR SYSTEM AND METHOD

(75) Inventors: Eric T. Heinze, Pewaukee, WI (US); Gregg J. Haensgen, Menomonee Falls, WI (US); Christopher M. Hofmeister, Menomonee Falls, WI (US)

(73) Assignee: RF Technologies, Inc., Brookfield, WI (US)

( * ) Notice: Subject to any disclaimer, the term of this patent is extended or adjusted under 35 U.S.C. 154(b) by 124 days.

(21) Appl. No.: 11/043,714

(22) Filed: Jan. 26, 2005

(65) Prior Publication Data

US 2006/0176177 A1    Aug. 10, 2006

(51) Int. Cl.
*G08B 13/14* (2006.01)
*G01N 27/416* (2006.01)

(52) U.S. Cl. ............... 340/572.1; 324/426; 340/636.1

(58) Field of Classification Search .. 340/568.1–572.9; 702/60–63; 320/114, 115, 127–136; 324/426–437
See application file for complete search history.

(56) References Cited

U.S. PATENT DOCUMENTS

| | | | |
|---|---|---|---|
| 4,782,345 A | 11/1988 | Landt | |
| 4,816,839 A | 3/1989 | Landt | |
| 5,455,575 A | 10/1995 | Schuermann | |
| 5,457,461 A | 10/1995 | Schuermann | |
| 5,485,166 A | 1/1996 | Verma et al. | |
| 5,528,232 A | 6/1996 | Verma et al. | |
| 5,629,981 A | 5/1997 | Nerlikar | |
| 5,673,037 A * | 9/1997 | Cesar et al. | 340/10.32 |
| 5,686,902 A | 11/1997 | Reis et al. | |
| 5,767,789 A | 6/1998 | Afzali-Ardakani et al. | |
| 5,768,140 A | 6/1998 | Swartz et al. | |
| 5,825,806 A | 10/1998 | Tuttle et al. | |
| 5,864,580 A | 1/1999 | Lowe et al. | |
| 5,887,269 A | 3/1999 | Brunts et al. | |
| 5,905,798 A | 5/1999 | Nerlikar et al. | |
| 5,914,671 A | 6/1999 | Tuttle | |
| 5,917,425 A | 6/1999 | Crimmins et al. | |
| 5,929,760 A | 7/1999 | Monahan | |
| 5,973,599 A | 10/1999 | Nicholson et al. | |
| 6,052,093 A | 4/2000 | Yao et al. | |

(Continued)

FOREIGN PATENT DOCUMENTS

EP    0 405 074 B1    1/1991

(Continued)

OTHER PUBLICATIONS

Letter to Mr. Yale Graves, McGaw, Inc., from Tim Mauck, RF Technologies, Inc., dated Jun. 2, 1997, 1 page.

(Continued)

*Primary Examiner*—Benjamin C. Lee
*Assistant Examiner*—Jennifer Mehmood
(74) *Attorney, Agent, or Firm*—Foley & Lardner LLP

(57) ABSTRACT

A locator system includes a handheld unit for providing an interrogation signal. The handheld unit can be a handheld computer or PDA including an RF module. The interrogation signal is received by an RF tag. The RF tag can include a power source and a memory. The memory can store an indication of the date of installation of the battery. The tag unit can provide the indication to the handheld unit in response to the interrogation signal.

21 Claims, 17 Drawing Sheets

U.S. PATENT DOCUMENTS

| | | | |
|---|---|---|---|
| 6,138,991 A | 10/2000 | Myers, Jr. | |
| 6,172,596 B1 | 1/2001 | Cesar et al. | |
| 6,175,308 B1 | 1/2001 | Tallman et al. | |
| 6,198,875 B1 | 3/2001 | Edenson et al. | |
| 6,225,949 B1 | 5/2001 | Guard | |
| 6,236,223 B1 | 5/2001 | Brady et al. | |
| 6,246,882 B1 | 6/2001 | Lachance | |
| 6,285,342 B1 | 9/2001 | Brady et al. | |
| 6,294,997 B1 * | 9/2001 | Paratore et al. | 340/572.1 |
| 6,422,476 B1 | 7/2002 | Ackley | |
| 6,445,297 B1 | 9/2002 | Nicholson | |
| 6,486,769 B1 | 11/2002 | McLean | |
| 6,518,885 B1 | 2/2003 | Brady et al. | |
| 6,535,175 B2 | 3/2003 | Brady et al. | |
| 6,542,114 B1 | 4/2003 | Eagleson et al. | |
| 6,563,425 B2 | 5/2003 | Nicholson et al. | |
| 6,593,845 B1 | 7/2003 | Friedman et al. | |
| 6,600,418 B2 * | 7/2003 | Sainati et al. | 340/572.1 |
| 6,608,551 B1 | 8/2003 | Anderson et al. | |
| 6,618,162 B1 | 9/2003 | Wiklof et al. | |
| 6,700,493 B1 * | 3/2004 | Robinson | 340/573.1 |
| 6,720,888 B2 | 4/2004 | Eagleson et al. | |
| 6,724,308 B2 | 4/2004 | Nicholson | |
| 6,747,558 B1 | 6/2004 | Thorne et al. | |
| 6,750,771 B1 | 6/2004 | Brand | |
| 6,761,352 B2 | 7/2004 | Scicluna et al. | |
| 6,765,484 B2 | 7/2004 | Eagleson et al. | |
| 6,784,789 B2 | 8/2004 | Eroglu et al. | |
| 6,894,612 B2 * | 5/2005 | Xydis | 340/539.11 |
| 6,943,678 B2 * | 9/2005 | Muirhead | 340/505 |
| 2002/0075152 A1 | 6/2002 | Nysen | |
| 2002/0111819 A1 | 8/2002 | Li et al. | |
| 2002/0153996 A1 | 10/2002 | Chan et al. | |
| 2003/0005316 A1 | 1/2003 | Girard | |
| 2003/0043042 A1 * | 3/2003 | Moores et al. | 340/573.1 |
| 2003/0095032 A1 * | 5/2003 | Hoshino et al. | 340/5.92 |
| 2004/0005497 A1 * | 1/2004 | Nunomaki et al. | 429/92 |
| 2004/0100384 A1 * | 5/2004 | Chen et al. | 340/572.1 |
| 2004/0134984 A1 * | 7/2004 | Powell et al. | 235/451 |
| 2004/0196006 A1 * | 10/2004 | Kawaguchi et al. | 320/132 |
| 2006/0038572 A1 * | 2/2006 | Philbrook | 324/426 |
| 2006/0044134 A1 * | 3/2006 | Elliott | 340/539.23 |

FOREIGN PATENT DOCUMENTS

| | | |
|---|---|---|
| EP | 0 785 527 A2 | 7/1997 |
| WO | WO90/05960 A1 | 5/1990 |

OTHER PUBLICATIONS

Letter to Tim Mauck, RF Technologies, Inc., from Yale Graves, McGaw, Inc., dated Apr. 18, 1997, 2 pages.

1996 Governor's New Products Certificate of Merit for the Development of RFT Locator, Wisconsin Society of Professional Engineers, May 17, 1996, 1 page.

RFT Locator, Asset Tracking/Locating System, Apr. 13, 1996, 1 page, RF Technologies, Inc.

Letter to Jack Nelmark, Wis. Society of Professional Engineers, from Glenn F. Jonas, RF Technologies, Inc., dated Mar. 14, 1996, 3 pages.

* cited by examiner

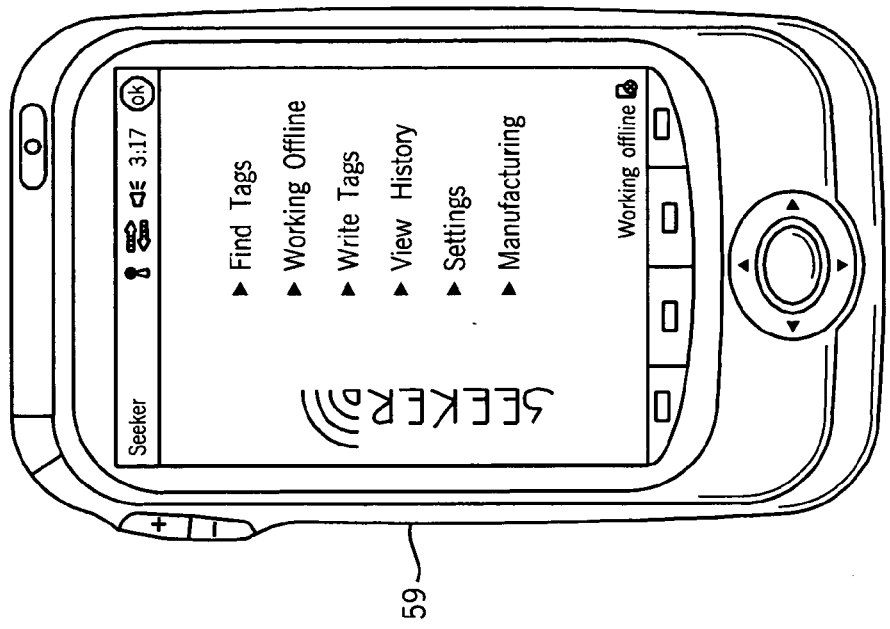
FIG. 2B
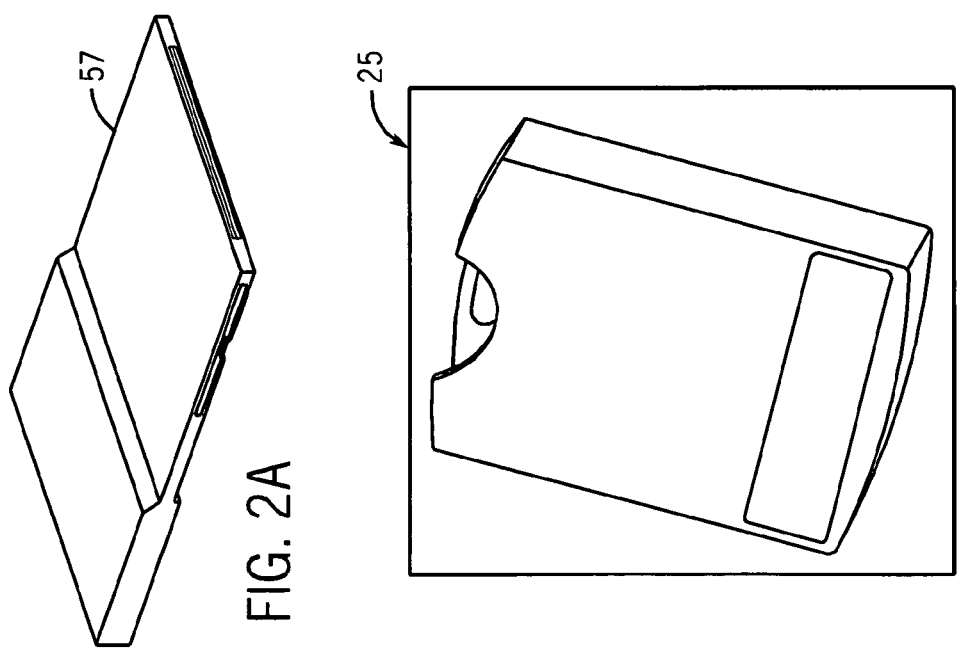
FIG. 2A
FIG. 3

Manufacturing — 1:14 ok — 896

Manufacture Date:

Month: 11
Year: 04

Program

FIG. 19

Settings — 10:05 ok — 894

Threshold: 25
Comm Port: COM1
Ruleset: New Layout
☑ Demo

Clear History

About | Settings | Services

MOBILE LOCATOR SYSTEM AND METHOD

BACKGROUND OF THE INVENTION

The present invention relates to a locator system. More particularly, the present invention relates to a locator system utilizing tags.

Locator systems can be utilized for asset tracking. Generally, a locator system is comprised of a handheld transceiver that facilitates remote location of items attached to or integrated with radio frequency (RF) tags. The handheld transceiver is typically a dedicated unit specifically designed to display data, execute software and provide RF signals that wirelessly poll the RF tags. The handheld transceiver includes a memory to store data received from the RF tags. Dedicated handheld units are expensive because they require a user interface, a power supply, a memory, a processor, and RF circuitry.

The RF tags typically include a transceiver and a memory, such as, an electronically erasable programmable read only memory (EEPROM). The transceiver and EEPROM are powered by a battery. The EEPROM of the RF tags are preprogrammed with a specific address or identification number. The RF tags are affixed to the outside of an item or integrated within the equipment that is to be tracked or located.

To locate an asset, the handheld transceiver provides an interrogation signal. All RF tags within the range of the interrogation signal respond to the interrogation signal and provide a signal containing the identification of the RF tag to the handheld transceiver. In certain conventional systems, the RF tag can also generate a beep in response to the interrogation signal to assist the finding of the equipment within the room or area being searched. The operation of the beep or other audible or visual indications can be controlled through the handheld transceiver.

Heretofore, the locator systems have not been able to precisely locate the asset within an area. Although conventional handheld locator systems provide an indication that the asset is within the range of the interrogation signal, locator systems generally do not provide a more precise indication of the location or even an indication of the direction to the tag from the handheld unit.

In certain conventional systems, the tags can also store a department number, group number or other identification in addition to the tag identification number. The department number can be used to identify a class of asset (e.g., wheelchair, heart monitors, IV pumps, etc.) or a group that is responsible for the asset (cardiology, janitorial, information systems, accounting, etc.). The tag generally provides the department number along with the identification of the RF tag in response to the interrogation signal.

Heretofore, the handheld transceiver has not been able to interrogate an area with limitations on particular department identifications. When the handheld transceiver is utilized in a particular area, all RF tags within range of the interrogation signal respond. The response by all tags within the area unnecessarily adds to the process of acquiring information when a user is only interested in receiving a response from certain RF tags, such as, those tags from a particular department. For example, if a user is interested in only obtaining tags associated with wheelchairs, and not tags associated with other medical equipment, the user has to wait to receive response form all tags before analyzing the responses from tags associated with wheelchairs.

Conventional handheld transceivers have also included a feature which provides the battery power level provided to the handheld computer in response to the interrogation signal. The battery power level is measured by circuitry within the RF tag. However, such systems do not provide day-to-day or more accurate indications of when the battery is expected to expire. The lack of more detailed and more timely information about battery expiration can allow the battery to expire without the user being aware of it. For example, if a tag unit is interrogated only every six months, the battery would likely expire during that six month period and the user would never know low levels of battery life had been reached.

Accordingly, there is a need for a tag unit and locator system that can more accurately determine when battery life in a tag unit will expire. There is also a need for a locator system that automatically provides an indication when the battery life of a tag unit will expire. Further still, there is a need to associate tag units found in a particular area with that particular area. There is also a need for an automated method of associating tag units with a particular area by polling a particular area. There is also a need for a locator system that is capable of selecting only tags associated with a particular department or product for a response to the interrogation signal. There is another need for a locator system that displays radio signal strength values as a bar graph to assist a user in determining the distance to an asset. There is also a need for a handheld transceiver unit that can be implemented using a common handheld computer such as a PALM®, Sony®, or Hewlett Packard® handheld computer (e.g., personal digital systems (PDA's)). Yet further still, there is a need for a low cost, reliable locator system.

SUMMARY OF THE INVENTION

An exemplary embodiment relates to a mobile locator system. The locator system includes a handheld unit for providing an interrogation signal and a tag unit for responding to the interrogation signal. The tag unit includes a power source. The tag unit also includes a memory. The memory stores an indication of a time of installation or manufacture of the power source. The tag unit is capable of transmitting the indication to the handheld unit.

Another exemplary embodiment relates to a method of locating an article. The method includes providing an interrogation signal with a handheld computer equipped with an RF interface. The method also includes responding to the interrogation signal with a tag unit associated with the article. The method further includes displaying on the handheld computer an indication of the presence of the article in response to the responding step.

Yet another exemplary embodiment relates to a locator system. The locator system includes a handheld unit for providing an interrogation signal. The handheld unit is capable of polling an area. The locator system further includes a plurality of tag units. Each tag unit is capable of responding to the interrogation signal. Each tag unit includes a memory storing an identification of the tag unit and a department identifier. The handheld unit is capable of polling the tag units in the area having a particular department identifier. The particular department identifier is selectable on the handheld unit. Only the tag units having the particular department identifier respond.

Still another exemplary embodiment relates to a locator system. The locator system includes a handheld unit and a plurality of tags. Each tag unit includes a memory storing an identification of the tag. The handheld unit provides an interrogation signal and is capable of polling an area. The system also includes an area tag associated with the area.

The area tag provides an identification associated with the area in response to the interrogation signal. The area tag assists in determining where the poll was performed. Each tag unit is capable of responding to the interrogation signal.

Still another exemplary embodiment relates to a locator system including a handheld unit and a tag unit. The handheld unit provides an interrogation signal. The tag unit responds to the interrogation signal with a tag signal. The handheld unit displays an indicator of signal strength for the tag signal.

Yet another exemplary embodiment relates to a locator system including a handheld and tag units. The handheld unit includes a graphical user interface. The graphical user interface provides a selection for a power level of the interrogation signal.

BRIEF DESCRIPTION OF THE DRAWINGS

Preferred exemplary embodiments are described below with reference to the accompanying drawings wherein like numeral denote like elements and:

FIG. 2A is a perspective view general schematic drawing of an RF module to use in the system illustrated in FIG. 1 in accordance with another exemplary embodiment;

FIG. 2B is a top view general schematic drawing of a handheld computer for use in the system illustrated in FIG. 1 in accordance with another exemplary embodiment;

FIG. 3 is a perspective view schematic drawing of a tag unit for use in the system illustrated in FIG. 1 in accordance with another exemplary embodiment;

FIG. 17 is a view history screen shot for the handheld computer illustrated in FIG. 2B;

FIG. 18 is another view history screen shot for the handheld computer illustrated in FIG. 2B;

FIG. 19 is a settings screen shot for the handheld computer illustrated in FIG. 2B;

FIG. 20 is a manufacturing screen shot for the handheld computer illustrated in FIG. 2B;

DETAILED DESCRIPTION OF THE PREFERRED EMBODIMENTS

Figure 1:
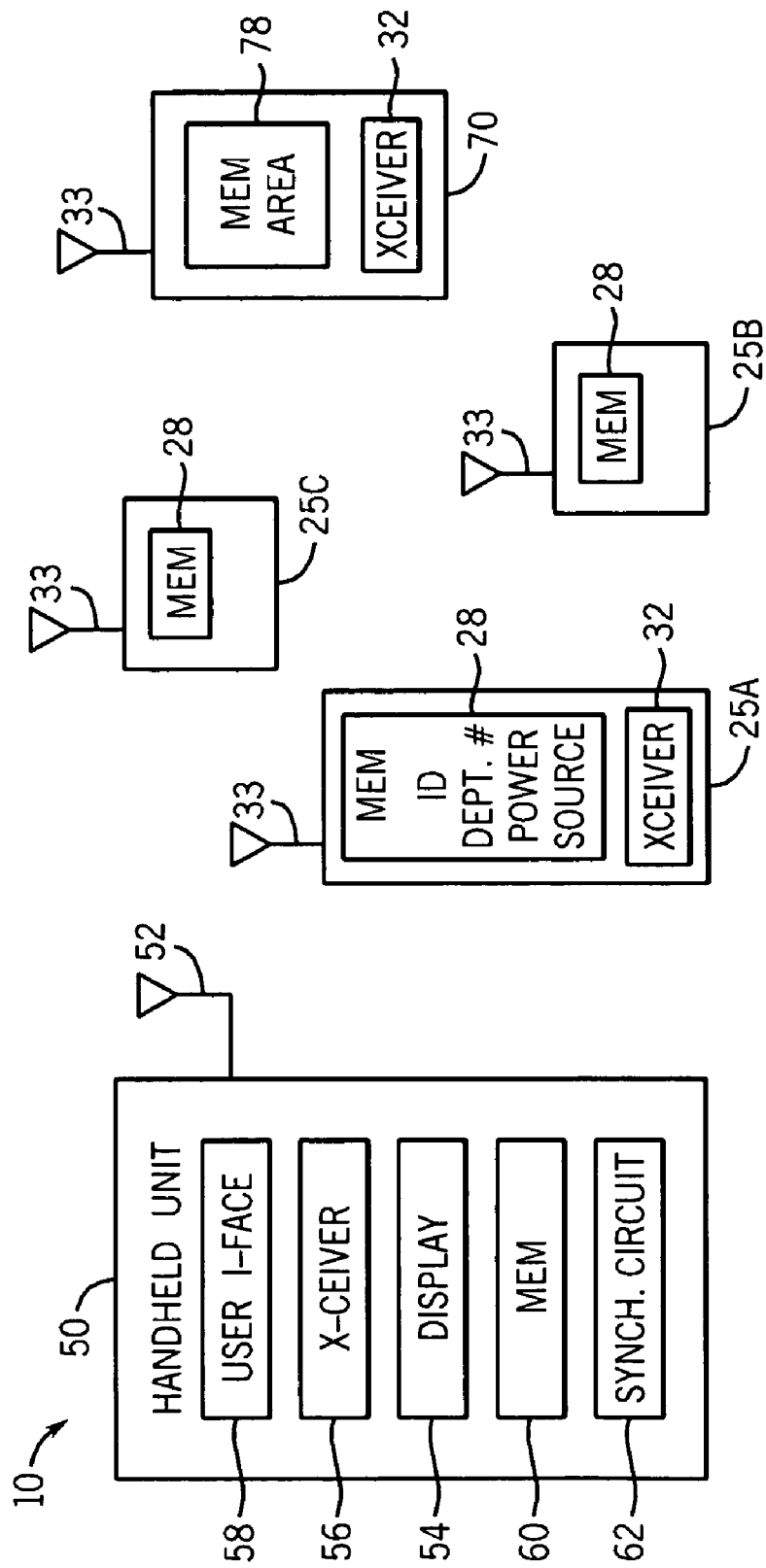
FIG. 1 is a general schematic block diagram of a locator system in accordance with an exemplary embodiment.

Referring to FIG. 1, a locator system 10 can be utilized in asset tracking applications. Asset tracking equipment can be particularly advantageous in large institutions, such as, hospitals and universities, where significant amounts of expensive equipment is stored for long periods of time between uses.

System 10 advantageously allows a user to more quickly locate assets and can aid in inventory tasks. System 10 is not limited to any particular locator applications or type of asset tracking. System 10 can be utilized to locate any type of asset including equipment, machines, devices, raw materials, live animals and human beings.

System 10 can be utilized with centralized asset tracking and security systems. For example, system 10 can be integrated with a central or host computer system 100 (FIG. 22), such as a PinPoint® system manufactured by RF Technologies. According to another embodiment, system 10 can communicate with one or more databases associated with external networks, the Internet, host systems, workstations, desk top computers, laptop computers, etc.

System 10 includes a handheld unit 50, a set of radio frequency (RF) tag units 25A-C, and an area tag unit 70. Although three tag units 25A-C are shown, any number of tag units 25A-C can be utilized in system 10 without departing from the present invention. Handheld unit 50 provides an interrogation signal to units 25A-C, and units 25A-C respond to the interrogation signal by providing a tag identification to the handheld unit 50. In addition, unit 70 responds to the interrogation signal by providing an area identification to enable automatic association of units 25A-C with an area. The area tag identification can be a number indicative of a particular location (e.g., third floor storage room, warehouse 7, etc.)

Handheld unit 50 includes a display 54, transceiver 56, a user interface 58, a memory 60 and a synchronization circuit 62. Handheld unit 50 can be embodied as a dedicated unit fabricated from ASICs, hardwired circuits, microprocessor-based control circuits configured by software, or other means for implementing at least one operation described below. Synchronization circuit 62 allows unit 50 to communicate with another computer systems and to exchange data with other databases remote from unit 50.

With reference to FIGS. 2A-B, handheld unit 50 is preferably a commercially available handheld computer 59 (PDA) combined with a plug-in RF module 57. Handheld computer 59 can be Axim® X 50, manufactured by Dell. Plug-in RF module 57 can utilize a compact flash, low power transceiver.

Display 54, a user interface 58, memory 60 and synchronization circuit 62 are implemented by handheld computer 59. Transceiver 56 is implemented by RF module 57. The use of handheld computer 59 provides significant hardware cost savings, reduces training time because handheld computer 59 has an already recognized easy to use interface, and allows unit 50 to be incorporated into equipment already carried by the user.

User interface 58 is preferably a touch screen associated with computer 59 (a commercially available handheld computer). Display 54 is preferably a color LCD display associated with computer 59. Transceiver 56 (e.g., module 57) can slide into the compact flash Type 2 slot in computer 59. Alternatively, module 57 can be a non-plug-in device coupled to handheld computer 57 by a connector. In another alternative, module 57 can be integrated within handheld computer 59.

An embodiment of handheld computer 59 executing locator software is shown as handheld computer 59 in FIG. 2B. Handheld computer 59 is preferably a pocket PC 0S2003-based device and memory 60 includes at least 512 megabytes of RAM. In addition, memory 60 can include or alternatively be flash memory, EEPROM, or any device for providing storage.

Transceiver 56 can include an antennae 52 (FIG. 1). Transceiver 56 preferably includes receiver circuitry and a microcontroller for decoding protocol to derive tag identification number, signal strength, and status of the tag.

Antennae 52 can be a whip antenna or a directional antenna. Antennae 52 allows a user to determine the direction and relative distance to RF tag units 25A-C by pointing antenna 52 and monitoring the received signal strength from tag units 25A-C.

The information decoded by the microcontroller on module 57 is provided to handheld computer 59 through the compact flash connector bus. Advantageously a driver is not required because the compact flash UART within module 57 communicates as a stream interface device. Data from module 57 is accessed as if it were a communication port.

Transceiver 56 preferably operates at 433 megahertz bands in a true ultra-low power radio protocol and utilizes frequency shift keying (FSK). Transceiver 56 can achieve a bit rate of 9600 kilobit per second.

RF tag units 25A-C can be SEEKER™ tags manufactured by RF Technologies, Inc. that operate in accordance with at least one of the operations described below. An embodiment of such a tag is shown in FIG. 3 as tag unit 25.

Each of tag units 25A-C is preferably a complete, self-powered electronic assembly including an RF printed circuit board, transceiver chipset, microstrip antenna for transmit and receive, and lithium coin cell battery, sealed in a plastic housing. An antenna 33 can be internal or external to the housing. Tag units 25A-C can be implemented in a variety forms. Units 25A-C can be transponder-based tags.

Memory 28 can be any form of data storage including an EEPROM. Memory 28 can be programmed at manufacture or installation. Alternatively, memory 28 can be programmed by providing data from handheld unit 50 to tag units 25A-C.

Tag units 25A-C preferably include low battery detection functionality. When one of tag units 25A-C is polled, it responds with its unique id and a status byte indicating its battery condition. If one of units 25A-C is instructed to beep during the poll, it will make an audible sound allowing users to gain a rough indication of where the tag is located.

Units 25A-C can have dimensions of 1.9"×1.38"0.7". Battery Life is typically 2-3 years (depending on how often it is polled). Units 25A-C preferably have a range of 200-300 feet. Units 25A-C receive FSK transmissions at 433.92 MHz (the interrogation signal) from unit 50 in the form of a poll. Unit 70 operates in a similar fashion to units 25A-C.

Tag units 25A-C wake up periodically and look to receive the preamble of the interrogation signal from unit 50. Each unit of units 25A-C that sees the poll in the area of unit 50 stays awake while watching for the Start Of Frame (SOF) and following data. The following data can include the department ID number for a group poll or the specific tag ID number for a tag specific poll. In a group poll (e.g., department poll), each of units 25A-C replies in its associated time slot based on the tag ID number of units 25A-C upon receiving the End Of Frame (EOF). Preferably, in a group poll (department) or tag specific poll, only units 25A-C from the selected group or the specifically selected units 25A-C respond. Tag units 25A-C are programmed to review the additional data for specific tag identification numbers or group identification numbers and respond only when those numbers match tag units 25A-C. If doing a tag specific poll, the tag being polled immediately replies upon seeing the EOF and valid checksum.

Units 25A-C can also respond to the interrogation signal with an indication of the radio signal strength indication (RSSI). The indication is for the signal received by handheld unit 50 from tag units 25A-C. The RSSI can be displayed on display 54 of unit 50. The RSSI provides a rough indication of the proximity of unit 50 to the responding unit of tag units 25A-C.

Area tag unit 70 is preferably similar to units 25A-C. However, unit 70 stores an area identification in its memory 28. Unit 70 responds to the interrogation signal with the area identification number According to one embodiment, each of tag units 25A-C can be assigned 1 of 240 tag identification numbers and 1 of 240 department identification numbers. The area identification number, identification numbers and department identification numbers can be associated with other data in a database stored in a host system or on handheld unit 50. The associated data can include text further describing the location, tag units 25A-C, asset that is being tracked, department, etc.

Unit 50 can store an associated area entry for each of units 25A-C that responds to the interrogation signal, thereby automatically associating responding tags units 25A-C with an area location. The identification number of responding tag units 25A-C can be stored with the location on unit 50 and/or in a host system.

In addition, a department poll can be performed to determine which tags belonging to a particular department should be associated with area tag unit 70. Unit 70 can be fixed within the area (e.g., attached to a wall) and can be powered by an AC power source, such as a standard outlet. Alternatively, unit 70 can be powered by a battery.

With reference to FIGS. 4-26, various operations performed by locator system 10 and components thereof are described below. Handheld unit 50 advantageously utilizes a graphical user interface (GUI) to receive commands from a user and provide data to the user. Although particular screen shots and particular methods of performing the operations are described and shown, they are for the purpose of illustration only and are not described in a limiting fashion. System 10 can perform the described operations in a variety of techniques without departing from the scope of the invention.

Preferably, software and/or firmware is executed by tag units 25A-C, tag unit 70, and handheld unit 50 to perform operations described below. The software for unit 50 is preferably windows CE-based, although other operating systems can be utilized.

Figure 4:
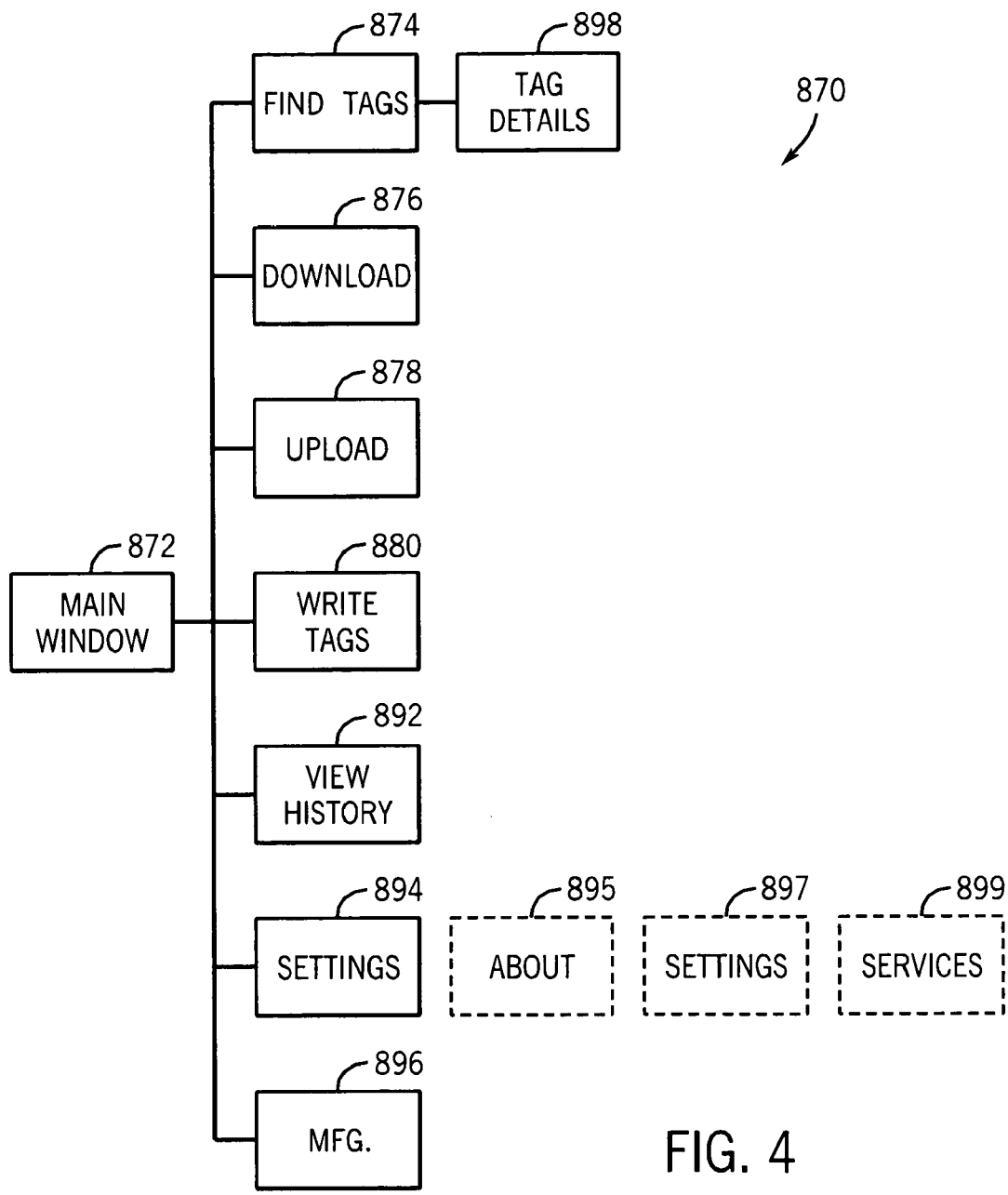
FIG. 4 is a general schematic block diagram of the windows hierarchy for software executed by the handheld computer illustrated in FIG. 2B in accordance with another exemplary embodiment.

With reference to FIG. 4, various operations for system 10 can be initiated through a windows hierarchy 890. The operations include a find tags operation in a window 874, a download operation in a window 876, an upload operation in a window 878, a write tags operation in a window 880, a view history operation in a window 892, a settings operation in a window 894, and a manufacturing operation in a window 896. The find tags operation in window 874 includes a tag details operation in a window 898.

The settings operation in window 894 includes an about operation in a window 895, a more detailed settings operation in a window 897, and a services operation in a window 899. Main window 872 is preferably the main navigation area.

Preferably, the software provides the ability for system 10 to find a specific tag in a department as well as find all tags in a department based upon selections in the graphic user interface. The tags that are found are provided in a list in a small viewing area associated with display 54.

The list can include an indication of the signal strength as received from units 25A-C and a low battery indication if it is past expiration based upon a date code. The software also allows power levels to be set for the interrogation signals. The software also allows a threshold to be for responses to the interrogation signals. The threshold is a minimum signal level for the response to be considered a legitimate response.

The software further allows history to be viewed so that results of previous polls with time stamps can be viewed. The software also allows data to be written to tags including IDs and manufacturing date code information to determine low batteries.

Synchronization circuit 62 can be utilized with a synchronization cradle associated with handheld computer 59. When computer 59 is inserted into the cradle, the database and the PDA can be synchronized with an MRM configuration database. An SQL server CE database can be present in the PDA and synchronized when the PDA is connected to a host computer. A menu option can be available in the user interface to allow the user to select where and when to synchronize.

Preferably, this synchronization process allows handheld unit 50 to upload its current collection of history records. Each time a tag unit 25A-C is read, a time stamp record is made of the tag read. These records can be uploaded to a PinPoint® recorder service or a host computer for inclusion in a log such as a PP Data Log. This allows the data to be visible to other PinPoint® applications such as, the PinPoint Information Center.

FIGS. 5-21 show screen shots for handheld unit 50 that are embodiments of windows hierarchy 870. In FIG. 4, main navigation area or window 872 allows an off-line or on-line mode to be selected. Window 872 allows selection of labels for the following operations: 1. find tags (window 874), 2. upload/download (work on-line/off-line) (with or without service database integration) (windows 876 and 878), 3. write tags (for programming new IDs into the tags) (window 880), 4. view history (window 892), 5. settings (window 894), and 6. manufacturing (typically hidden based on XML file setting) (window 896). The screen shots associated with the above selections and the operations associated therewith are discussed below as follows.

Figure 6:
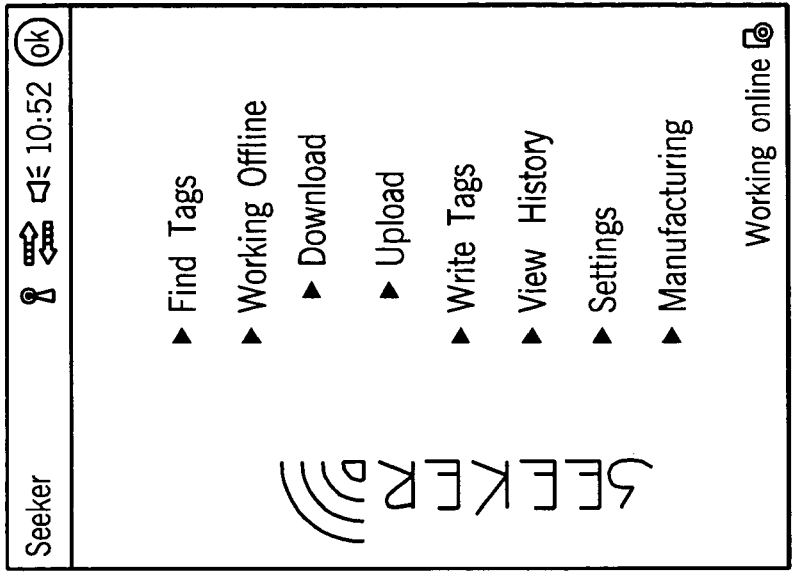
FIG. 6 is another main window screen shot in an on-line mode for the handheld computer illustrated in FIG. 2B.

With references to FIG. 6, the user can select the working on-line label. Working on-line allows the user to integrate information with a database. The information can include data obtained by polling tag units 25A-C. The on-line mode operates with the local databases and allows downloading to larger PinPoint® databases. The on-line mode provides more descriptions for tags and assets and uses tag ID numbers for polling operations. In an off-line mode, information about tag units 25A-C are stored directly in unit 50.

Figure 5:
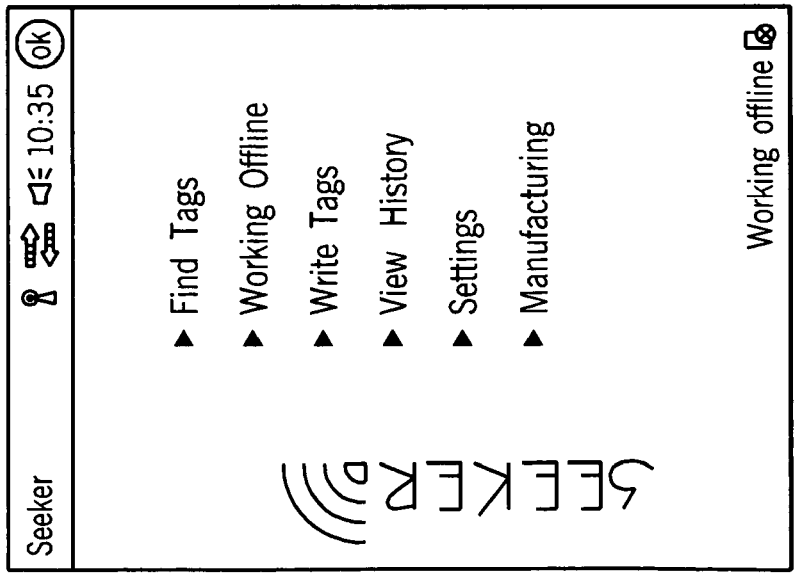
FIG. 5 is a main window screen shot for the handheld computer illustrated in FIG. 2B in an off-line mode.
Figure 8:
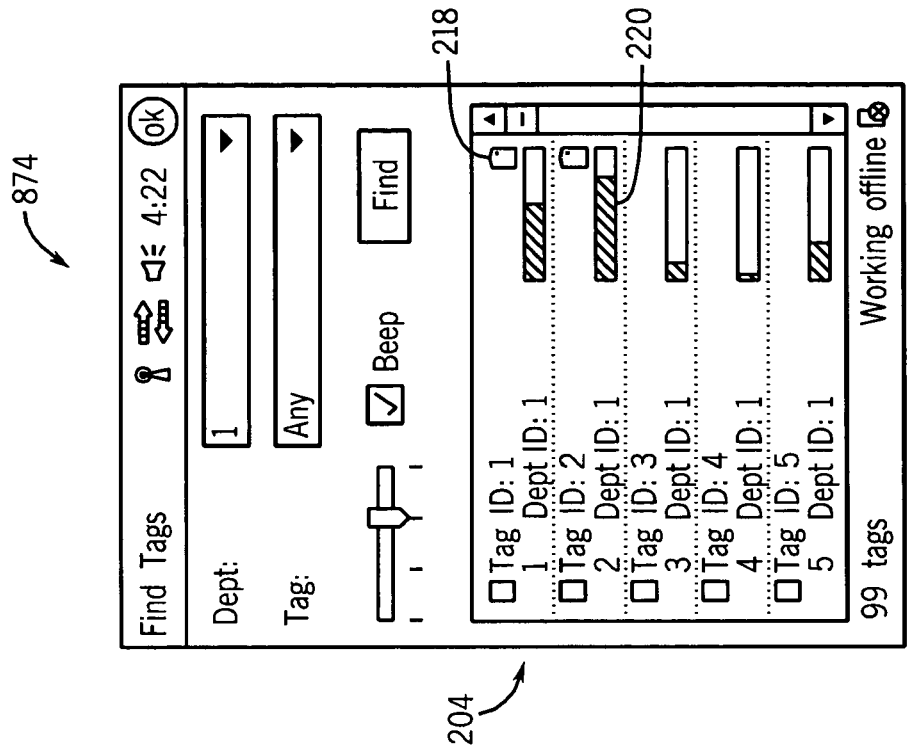
FIG. 8 is another find tags screen shot in an off-line mode for the handheld computer illustrated in FIG. 2B.
Figure 7:
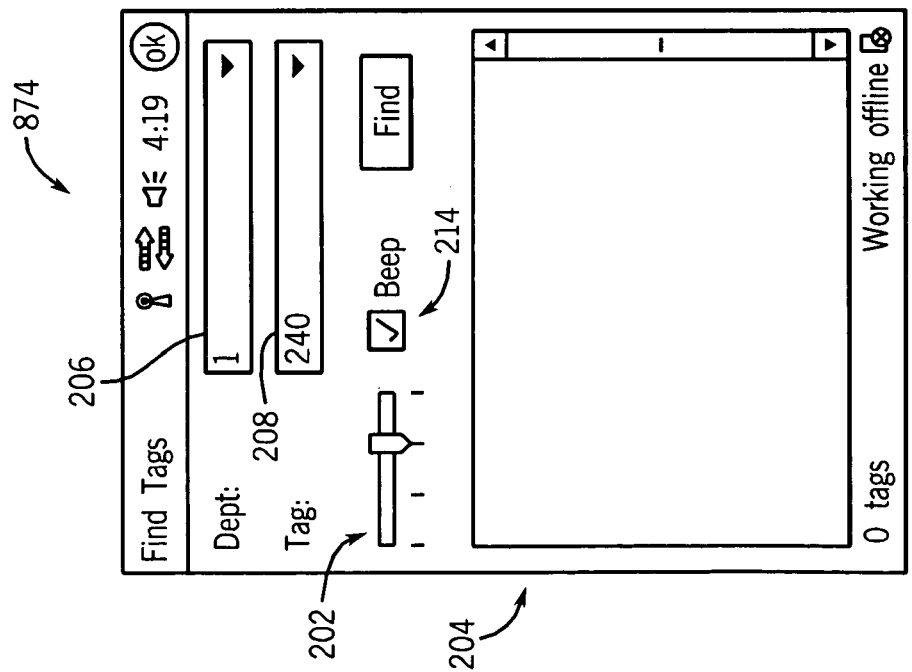
FIG. 7 is a find tags screen shot in an off-line mode for the handheld computer illustrated in FIG. 2B.

With reference to FIGS. 5 and 7, upon selecting a find tag label, a window 874 (FIG. 7) is provided on display 54 in an off-line mode. In window 874, the user can select a department identification number from a menu 206. The department identification selection can be any department number to one or more specific department numbers. The user can also select a tag identification number from a menu 208. The tag identification selection can be any tag identification number to one or more specific numbers. The user can also cause one of the selected tags units 25A-C to beep via beep control 214.

In an off-line mode, the user can select a department and tag to receive a response from selected tags 25A-C.

Advantageously, window 874 includes a power output selection bar 202 that allows the power level to be set for the poll request (the interrogation signal). In one embodiment, three settings can be utilized. However, the present invention is not limited to a particular number of settings. The use of bar 202 allows the user to adjust the power of the interrogation signal so that it does not reach as far of a distance. In this way, only tag units 25A-C in a closer vicinity respond.

With reference to FIGS. 7-10, tag units 25A-C can be identified in region 204 of window 874. Tag units 25A-C can be identified by selecting the find tags label in an off-line mode. Region 204 preferably provides the tag identification number, the department identification number, RSSI and an indication 218 of battery condition from memory 60. Indication 218 of battery condition is preferably a picture of a battery that indicates that the battery is nearing expiration. If indication 218 is absent, the battery is in relatively good condition.

Indication 218 is preferably based upon a calculation of the length of time the battery is in service. Alternatively, indication 218 can be based on a power measurement and the length of time the battery is in service. The length of time is calculated using the installation date stored in memory 28 of tag units 25A-C.

Alternatively, indication 218 can be a bar graph showing the remaining expected battery life of the tag unit. Once the battery installation date is known, unit 50 can track the expected battery life and provide an automated warning when the battery is nearing the expiration. For example, when the date associated with low battery life is reached (e.g. 2 months or less), a warning can be provided on unit 50 that the battery for the particular units of units 25A-C has a low battery.

An indication 220 of received signal strength from tag units 25A-C can also be shown in area 204. Preferably, indication 220 is a bar graph corresponding to the received signal strength. In the off-line mode, indication 220 is for the last interrogation The signal strength is measured at unit 50. The received signal strength can also be represented by other symbols to show the received strength from tag units 25A-C. The received signal strength provides a rough estimation of the closeness of the tag units 25A-C.

In an alternative embodiment, the received signal strength can be related to the signal strength provided by unit 50 and measured tag units 25A-C. In such an embodiment, tag units 25A-C measure the received signal strength of the poll or interrogation signal from handheld 59. Tag units provide 25A-C an indication of the measurement to unit 50.

Figures 9, 10:
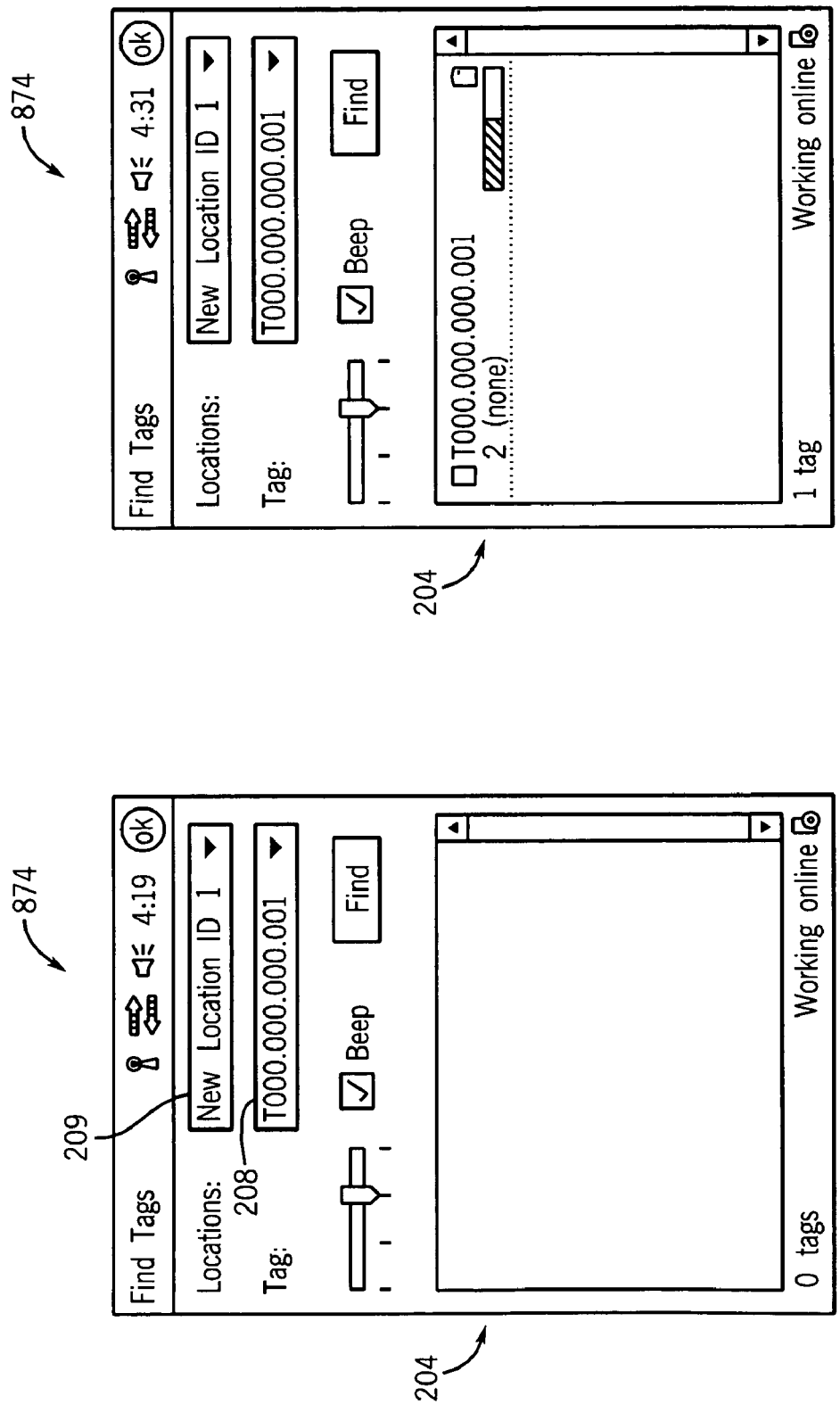
FIG. 9 is another find tags screen shot displaying a tag in an on-line mode for the handheld computer illustrated in FIG. 2B.
FIG. 10 is another find tags screen shot in an on-line mode for the handheld computer illustrated in FIG. 2B.

With reference to FIG. 9, window 874 shows a user selecting a particular tag identification number via menu 208 for a find tag operation in an on-line mode. Tag identification number T000.000.000.000.001 is chosen. The user can also select location identification in window 874.

Figures 11, 12:
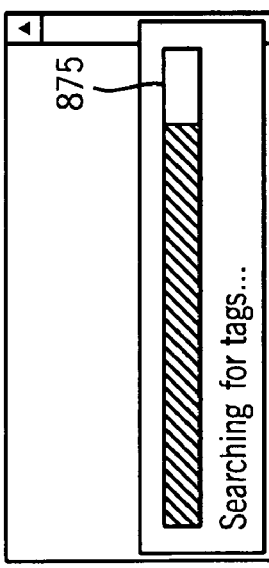
FIG. 11 is another find tags screen shot in an off-line mode for the handheld computer illustrated in FIG. 2B.
FIG. 12 is a tag details screen shot for the handheld computer illustrated in FIG. 2B.

FIG. 11 shows a progress bar 875 for window 874. The progress bar indicates the progress of the search task.

Figures 13, 14:
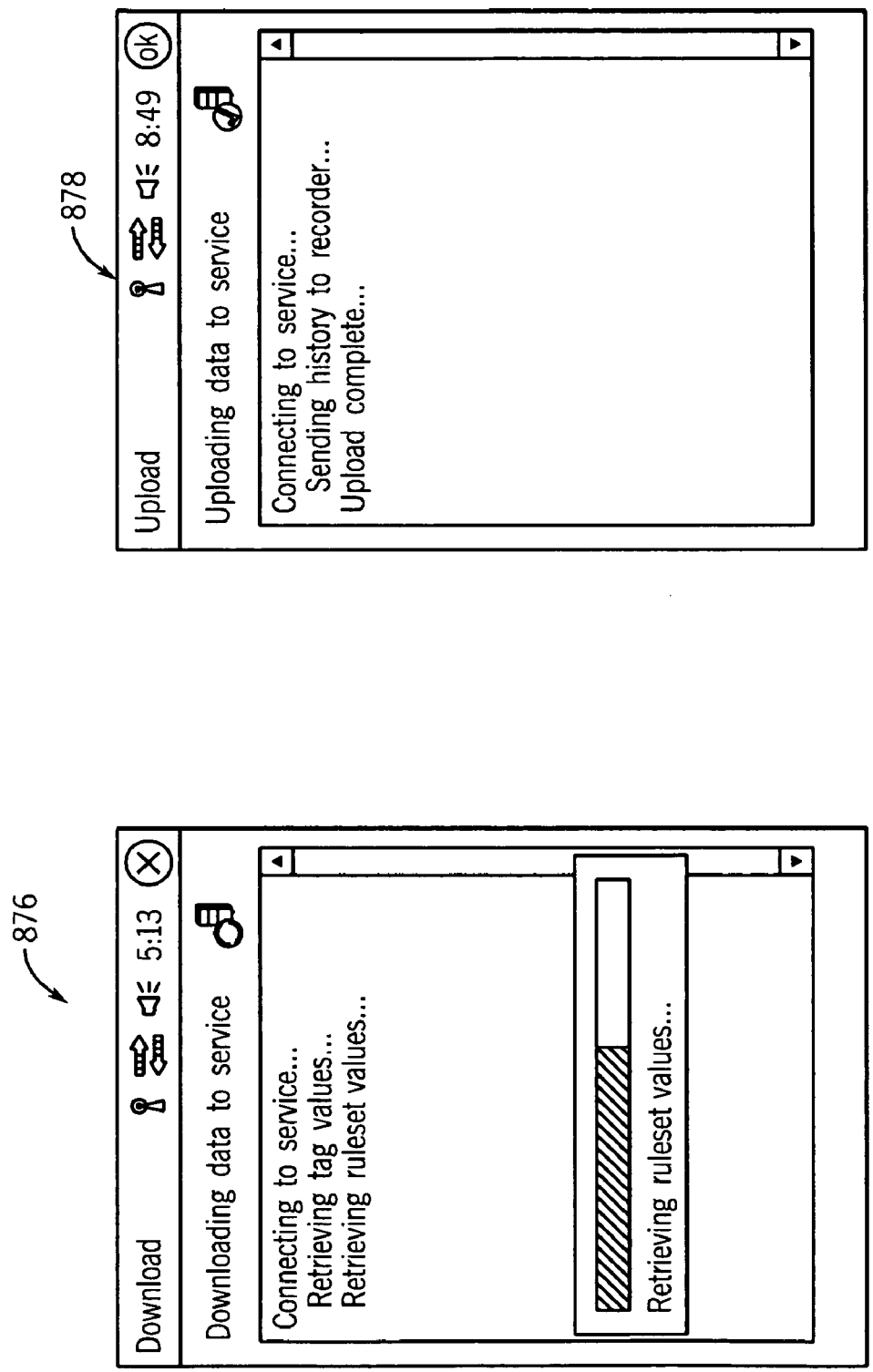
FIG. 13 is a download screen shot for the handheld computer illustrated in FIG. 2B.
FIG. 14 is an upload screen shot for the handheld computer illustrated in FIG. 2B.
Figure 16:
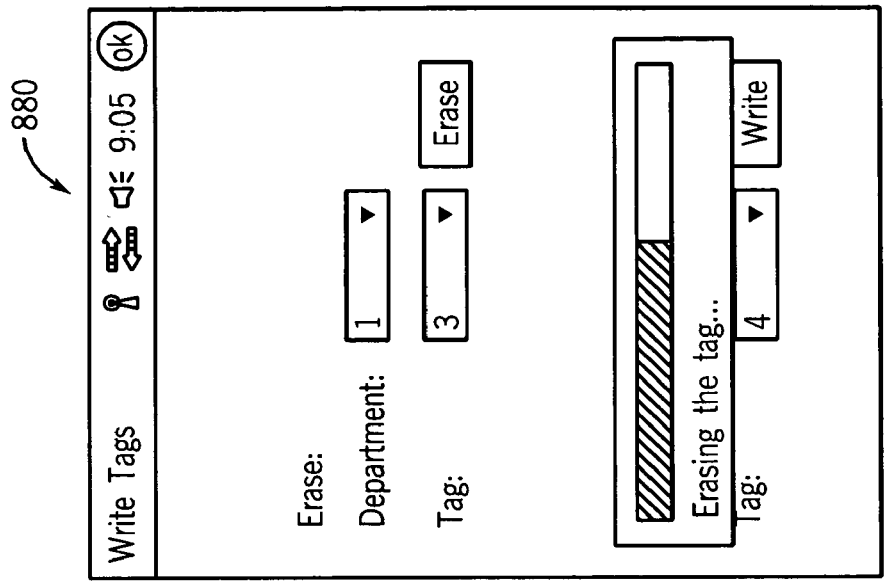
FIG. 16 is a write tags screen shot for the handheld computer illustrated in FIG. 2B.

With reference to FIGS. 4, 5, and 13, selecting working off-line label allows a user to select a download action or an upload action label. Working off-line using the download action label allows the user to retrieve rule sets, locations, and tag tables from memory 60 in a window 876 (FIG. 13). The rule sets, locations and tag tables can be stored in memory 60 associated with a PinPoint® configuration service. Download operations are also available in an on-line mode.

Selecting the upload label allows the user to send the history table one record at a time to memory 60 in a window 878 (FIG. 14). The data can be stored in or reserved in the area PinPoint® recorder service. Information can also be downloaded to a host system so that the host system can provide an automated warning or monthly report of units 25A-C that require battery replacement based upon the installation date of the battery or other battery life indication. Upload operations are also available in an on-line mode.

In FIG. 12, tag details window 898 (in an off-line mode) provides an indication of signal strength, the department identification number, and tag identification number. Window 890 includes signal bar 877.

Window 898 preferably can provide additional information about tag units 25A-C. In an off-line mode, the tag ID, department ID, and signal strength are displayed. The information can be displayed by clicking onto a tag listed in the tag list. In an on-line mode, the tag ID, resource, signal strength, and description are displayed.

The resource and description preferably come from a database on handheld computer 59. Additional database fields such as custom tag information, asset type, etc., can be retrieved from configuration service and displayed here.

Figure 15:
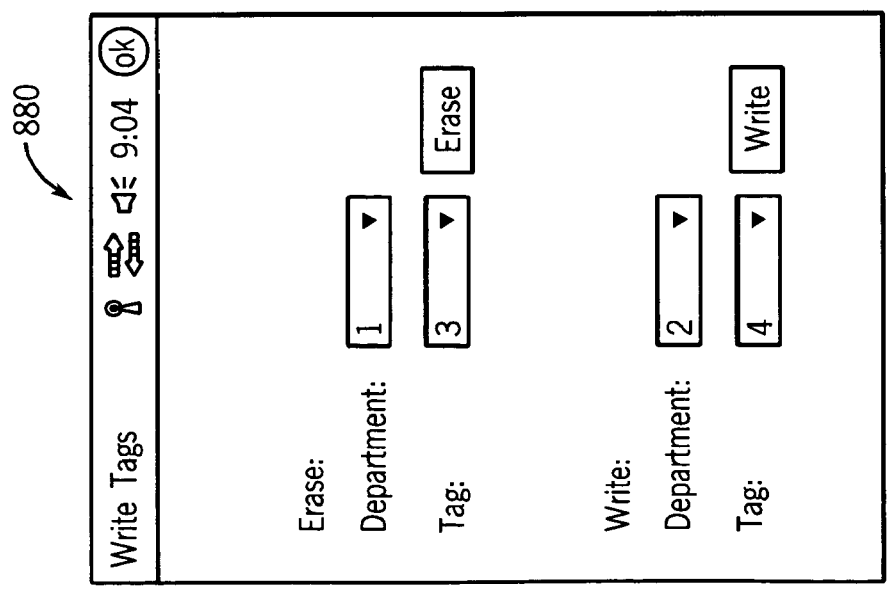
FIG. 15 is a write tags screen shot for the handheld computer illustrated in FIG. 2B.
Figure 21:
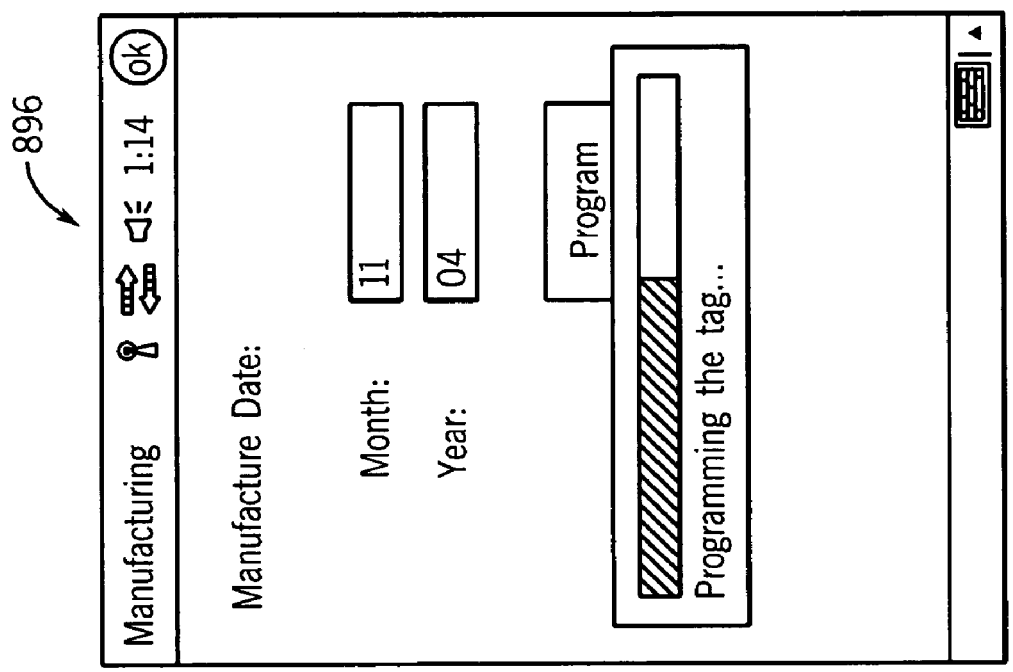
FIG. 21 is another manufacturing screen shot for the handheld computer illustrated in FIG. 2B.

With reference to FIG. 15, write tags window 880 is shown. Write tags window 880 allows the user to select a department identification number or tag identification number and erase the existing department identification number and tag identification number. To change a department identification number and tag identification number, the tag unit 25A-C must be erased before a new department identification number and/or tag identification number can be programmed into them. In one embodiment, any tag that is set to a tag identification number 0 and a department identification number 0 and receives a write message will have a new tag identification number and a new department identification number programmed.

Unit 50 provides an interrogation signal to the selected unit of units 25A-C to erase its tag identification number and/or department identification number. Unit 50 provides a new tag identification number and department identification number which is stored in memory 28 by the selected unit of units 25A-C.

Figures 17, 18:
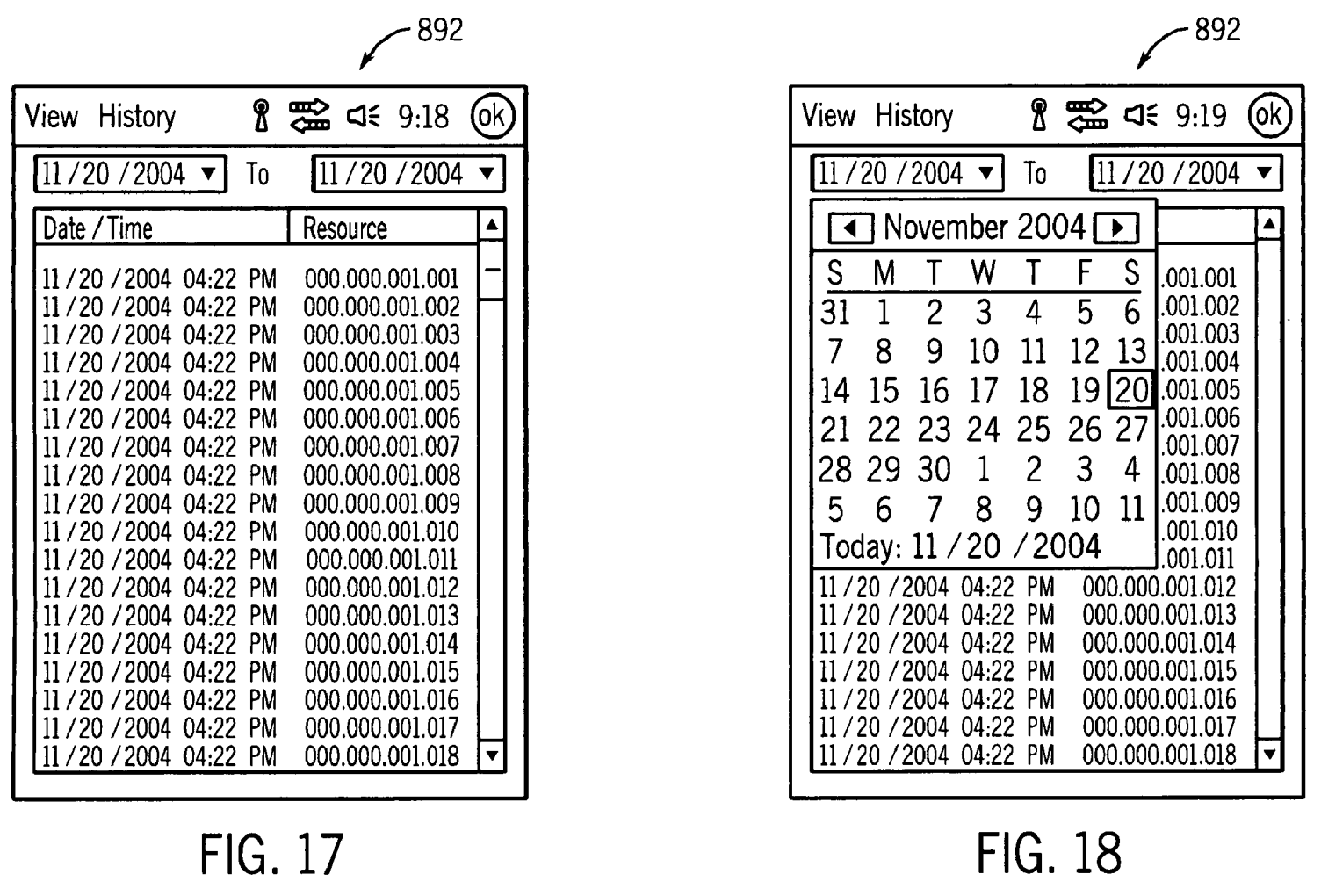

With reference to FIGS. 17 and 18, a view history window 894 is shown. Each time a tag is found or received, a record is created in a history table in the SQL CE server database of unit 50. The record preferably includes a time stamp, a tag ID and location (if on-line) and other relevant information. The historical data can be viewed through view history window 894 and can be filtered using date time picker controls. Sequences of data from a start date to an end date can be displayed.

With reference to FIG. 19, settings window 894 is shown. Settings window 894 allows a threshold value to be selected for a minimum signal strength value a tag must be received at in order to register the tag units 25A-C in the tag list. Preferably, values of 1 through 90 are available. Settings window 894 also allows the communication point to be chosen and rule sets to be chosen. A clear history button can be used to clear the history table and storage on unit 50.

With reference to FIG. 20, a manufacturing window 896 is shown. The manufacture or installation time including a month and year can be programmed to a tag in window 896. Alternative forms of the date can be stored.

Figure 24:
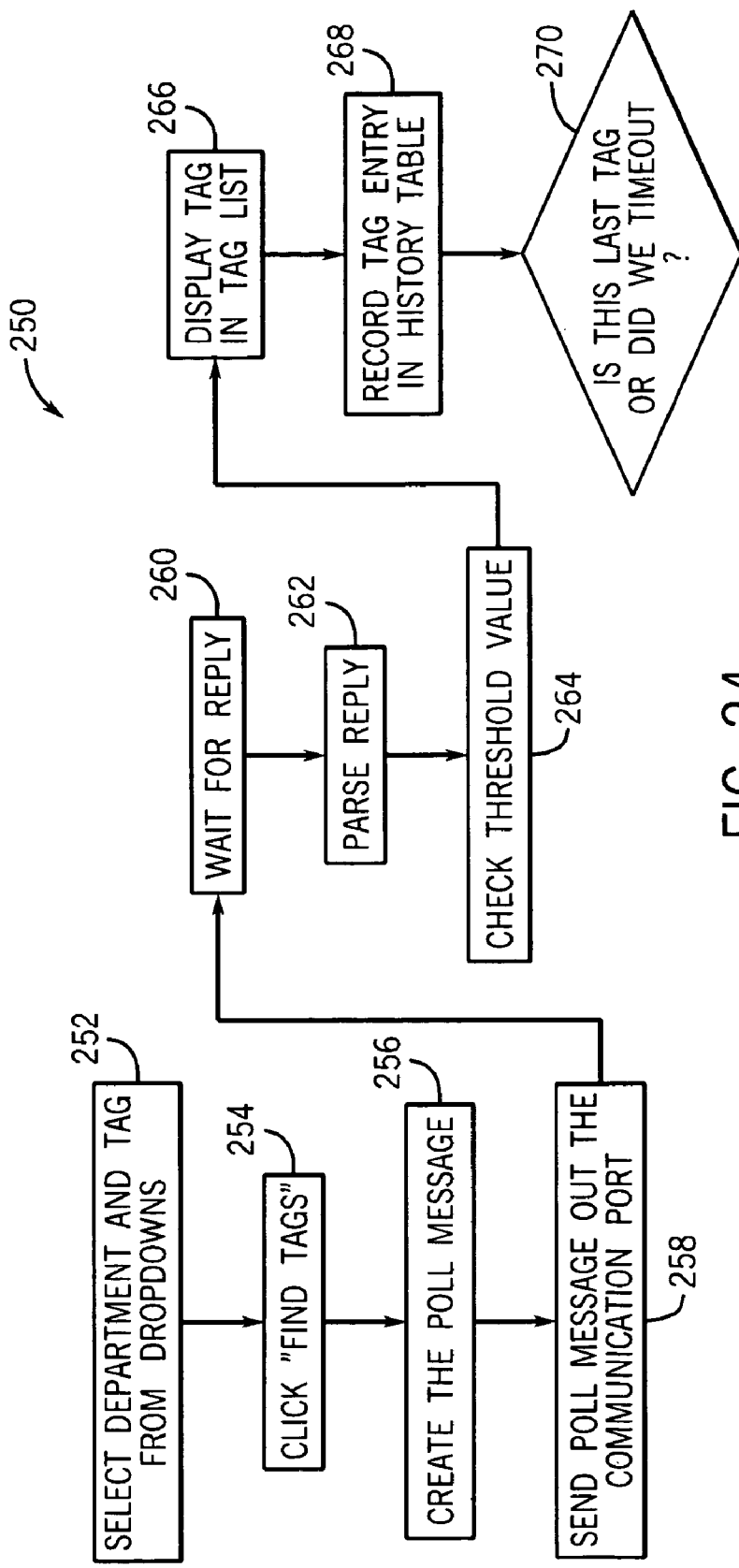
FIG. 24 is a flow diagram showing an overview of the polling operation.

With reference to FIG. 24, a flow diagram 250 shows a find tag operation which can be implemented through find tag window 874 (FIG. 9). At a step 252, a department identification number and/or tag number can be selected from a drop down menu. At a step 254, the user can select the find tags button. System 10 creates a poll message in handheld computer 59. At a step 256, a poll message is created in handheld computer 59.

At a step 258, the poll message is provided through the communication port to RF module 57. At a step 260, handheld unit 250 waits for a reply from tag units 25A-C. When a reply is received, the reply is parsed at a step 264. The parsed replies are checked against a threshold value. The threshold value is preferably set in settings window 897.

At a step 266, handheld unit 50 displays a list of found tag units in an area 204 of window 874. Only tag units 25A-C that have a response that is greater than the threshold value are displayed. In this way, weaker signals and spurious signals can be automatically eliminated from the tag list. At a step 268, the tag identifications and additional information about the tag are recorded in the history table including a time stamp. At a step 270, the find tag operation is complete after the last tag had been entered into the history table or if a time out occurs.

With reference to FIG. 24, a protocol 1000 for the find tag operation is shown. At a step 1002, poll time out values are obtained. A step 1004, a progress bar is set such as progress bar 875 shown in FIG. 11. At a step 1006, a poll start time is set. The poll start time is used to calculate a time out.

At a step 1008, unit 50 waits until a byte is received in a queue or a time out occurs. At a step 1010, the byte is analyzed to determine if it is start up header byte. At a step 1012, unit 50 waits for the next byte to occur or for a time out to occur. At a step 1014, the byte is determined if it is an R byte for a response. In step 1010, if the byte is not a start up header byte, unit 50 returns to step 1008. If the byte is not an R byte for a response in step 1014, handheld unit 50 returns to step 1008. In step 1014 if the byte is an R byte for a response, unit 50 advances to a step 1020. At step 1020, the lentype byte is obtained from the queue.

At a step 1022, the message length, is set by a byte.

At a step 1024, unit 50 waits to receive the rest of the bytes in the message based upon the message length obtained in step 1022 or until a time out occurs. At a step 1026, the response byte array is stuffed At step 1028, the response is analyzed for a valid end-of-message. If a valid end-of-message is obtained, the system returns to step 1008. If a valid end-of-message is obtained, system 10 advances to a step 1030.

At step 1030, the system verifies the check sum. If the check sum is correct, unit 50 advances from step 1030 to step 1040. If it is not a valid check sum, unit 50 advances to step 1008. At a step 1040, the system creates and fills the poll response object for the data structure.

At a step 1042, unit 50 displays a response in a tag list, such as area 204 of window 874 (FIG. 7) in a step 1042.

At a step 1044, unit 50 tracks to determine if the last tag has been checked. If so, unit 50 completes the operation at a step 1046. If not, unit 50 returns to step 1008.

Figure 26:
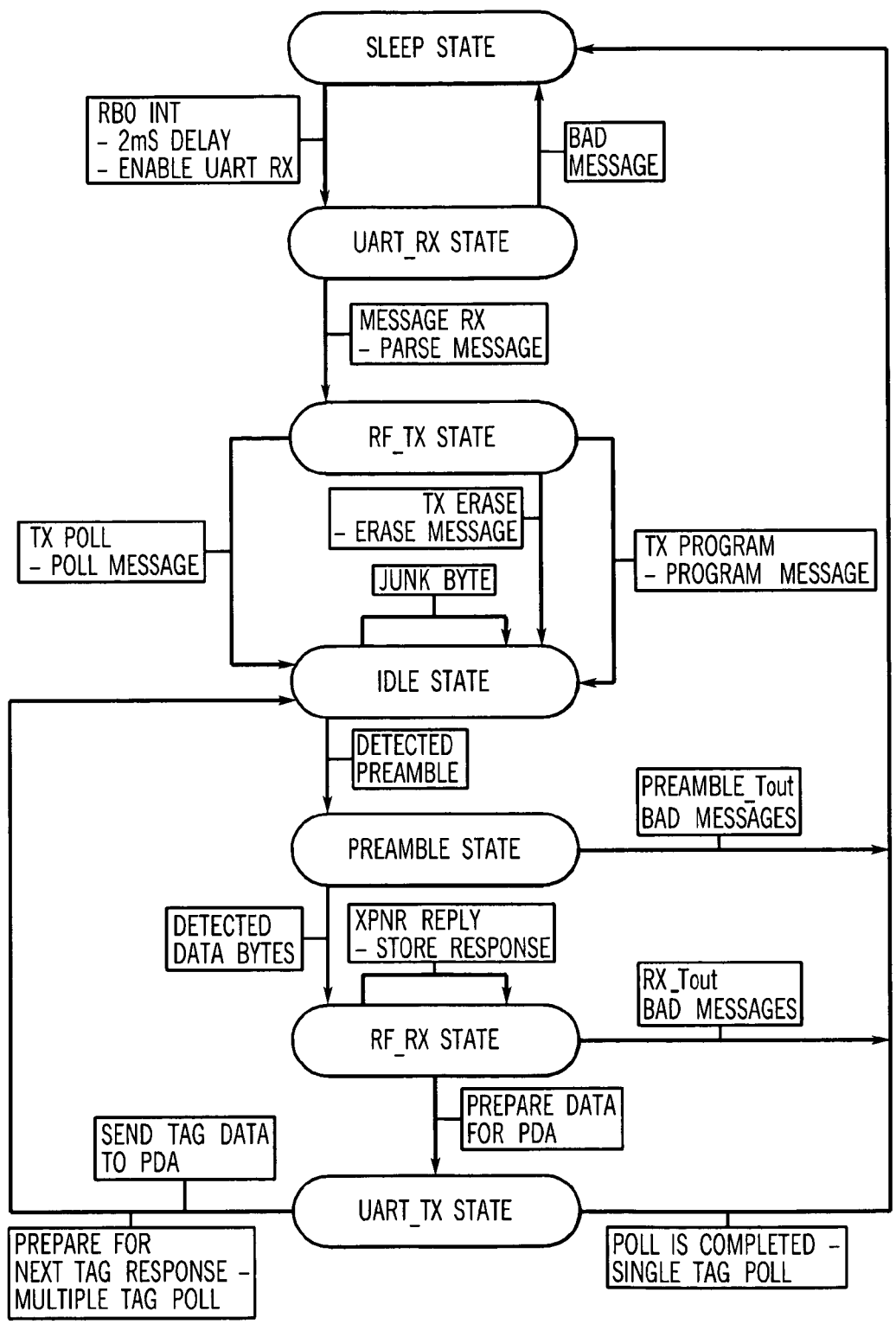
FIG. 26 is a state chart for the handheld unit illustrated in FIG. 1.

With reference to FIG. 26, a flow chart 900 illustrates operation of handheld unit 50. At a state 902, unit 50 is in a sleep mode. Unit 50 reaches a UART received state 904. In a UART received state 904, unit 50 generates a transmit message and advances to transmit state 906. If the message is a poll message, an erase message, or a programmed message, the operation is performed and preamble state 908 is reached. If the preamble is detected, a received RX state 910 is reached and unit 50 is returned to sleep state 902.

Figure 25:
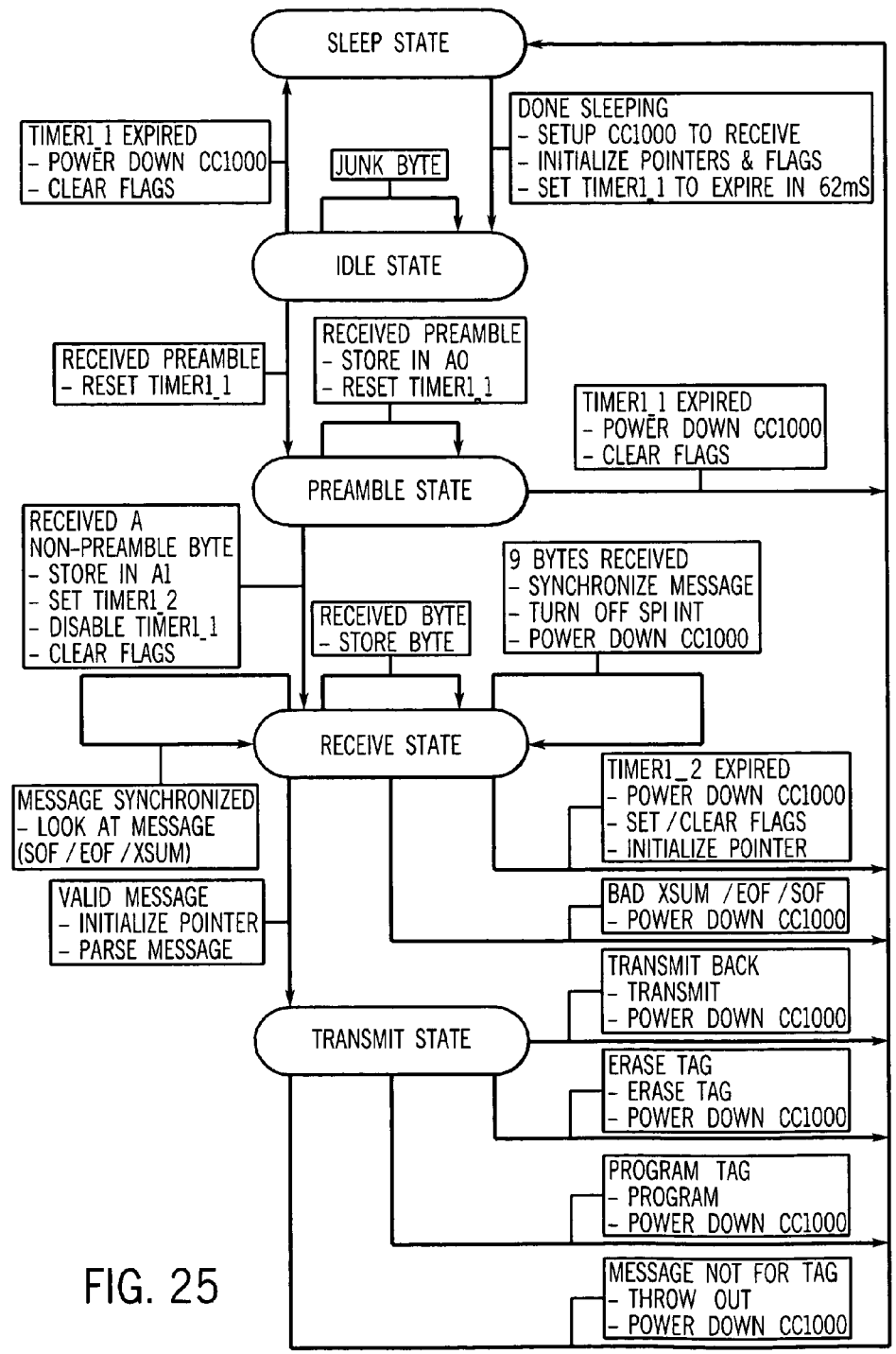
FIG. 25 is a state chart for the RF tag illustrated in FIG. 3.

With reference to FIG. 25, a more detailed state chart is shown for the operation of RF tag units 25A-C. In a state 1102, describing tag units 25A-C exists in a sleep state 1102. In step 1104, an idle state is reached. At a state 1106, a preamble state is reached in which a preamble is received and stored.

After preamble state 1106, a received state 1108 is reached for receiving bytes to be transmitted. Preferably, 9 bytes are received.

At a state 1110, the bytes are transmitted. After state 1110, module 57 returns to state 1102.

Figure 22:
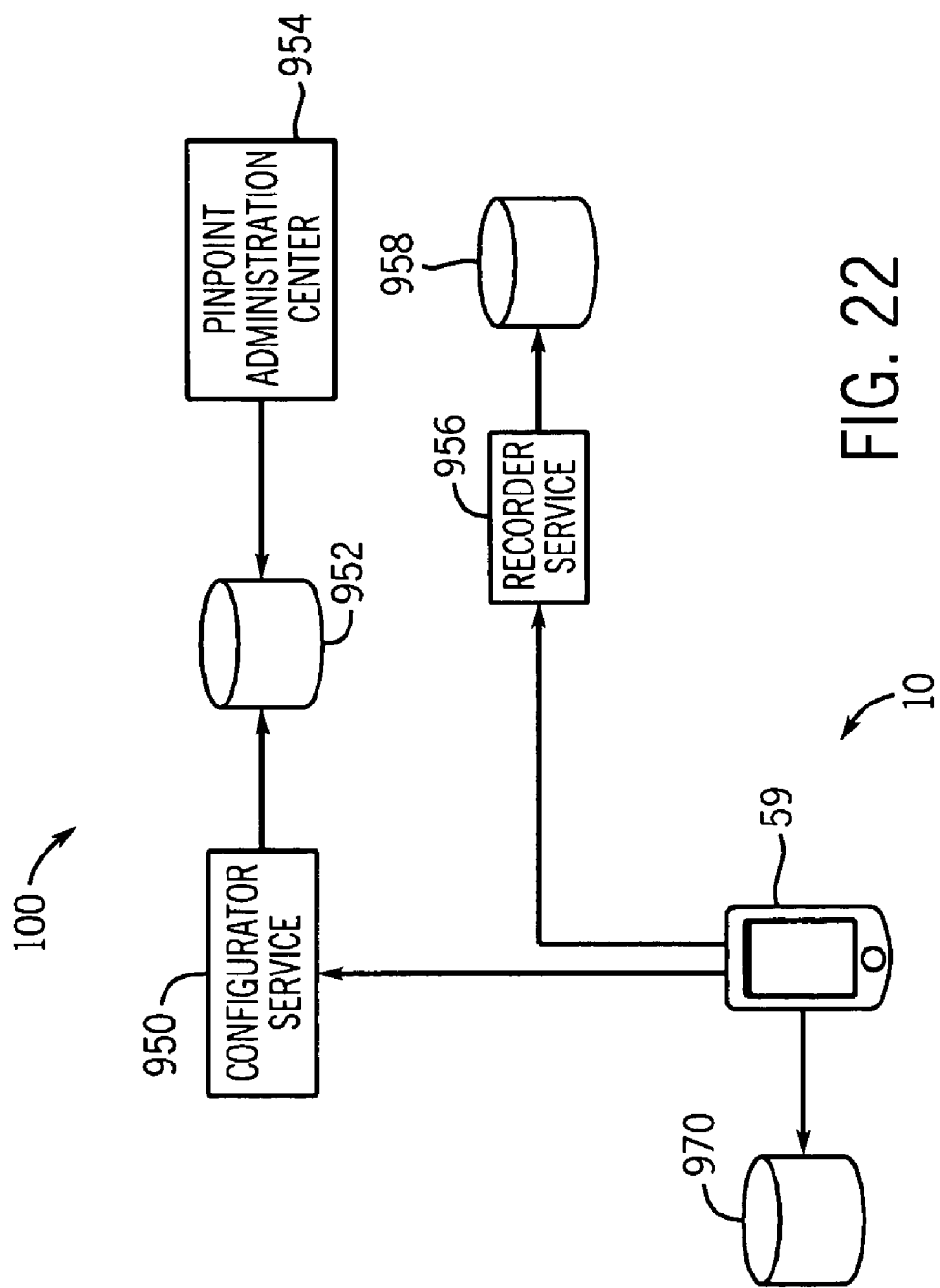
FIG. 22 is a general block diagram of the locator system illustrated in FIG. 1 employed in a host computer system in accordance with yet another exemplary embodiment.
Figure 23:
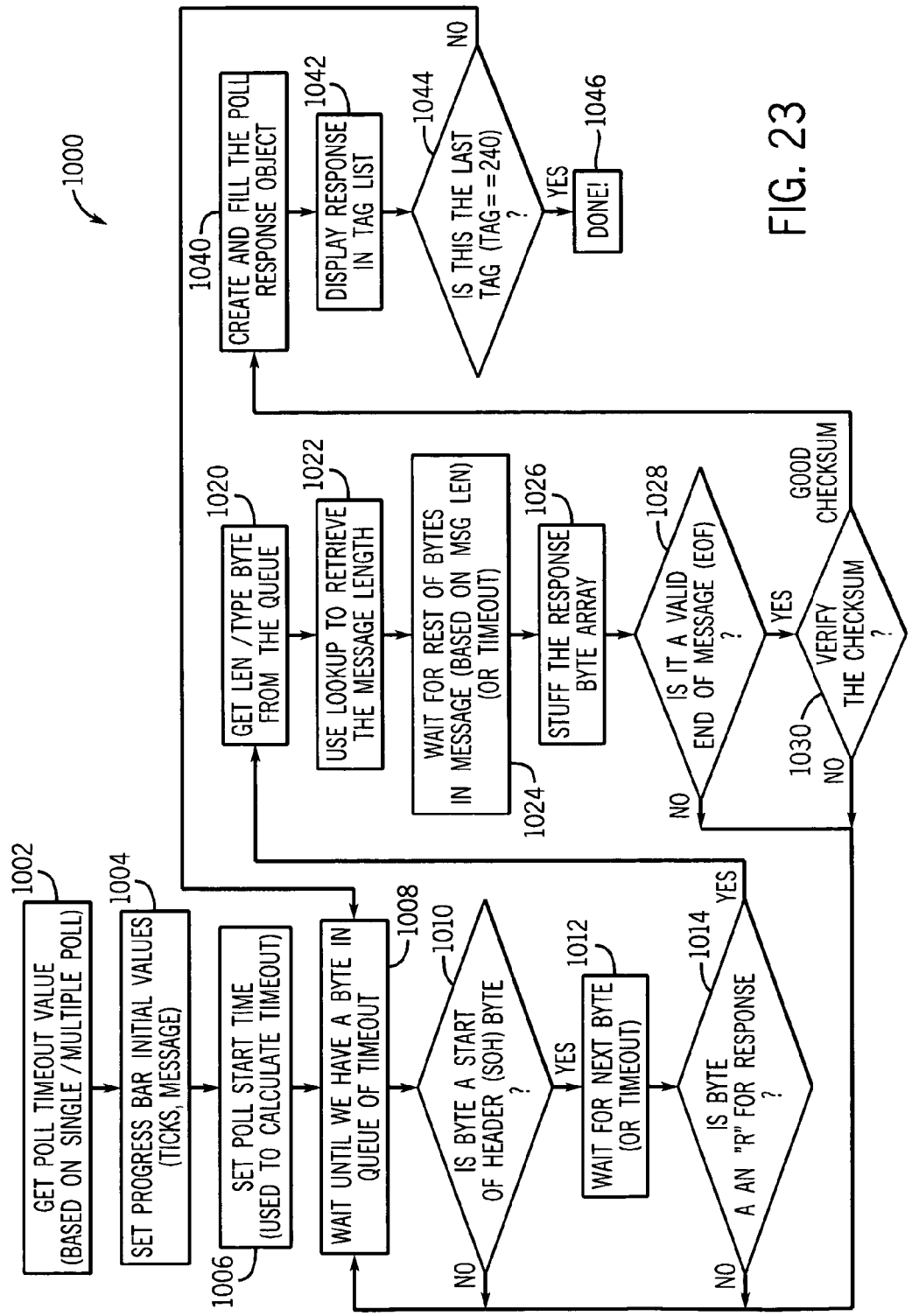
FIG. 23 is a flow chart showing a polling operation for the system illustrated in FIG. 1 in accordance with still another exemplary embodiment.

With reference to FIG. 22, locator system 10 can be utilized as part of a larger system 100 such as a PinPoint® system. According to such system, synchronization circuit 62 can be utilized to connect to a configuration service 950 which is coupled to a tables, tags, rule sets and location database 952. Configuration service and database 952 can be part of a host computer, server, workstation, or other computing device capable of database management. Database 952 is coupled to PinPoint® administration center 954. In addition, handheld computer 59 can sync with a database with a recorder service 956. Recorder service 956 preferably communicates with a database 958. Handheld computer 59 can also communicate with SQL server 960 for local storage.

System 100 allows the user of handheld computer 59 to select the location they are at before they perform a poll and then store the tag information for later transmission to the history database. With such a system, automatic association of tags with locations can be achieved. As discussed with reference to FIG. 1, an area tag unit 70 can be utilized to identify a particular area for the poll or it can be manually inputted or downloaded from a database.

Service 950 is used to retrieve tag identification numbers, rule sets, and location tables. Preferably, only tags associated with the locator system (not other PinPoint® tags) are retrieved. Once recorder service 956 has sent data to database 958, the table history records become viewable by other PinPoint® applications such as, PinPoint® administration center 954.

It is understood that, while preferred embodiments, examples and values are given, they are for the purpose of illustration only. The apparatus and method of the invention are not limited to the precise details and conditions disclosed. For example, although specific geometries, ranges, and protocols and types of operations are described, other algorithms, dimensions, and protocols could be utilized.

Thus, changes may be made to the details disclosed without departing from the spirit of the invention, which is defined by the following claims.

What is claimed is:

1. A locator system, comprising:
   a hand held unit for providing an interrogation signal; and
   a tag unit for responding to the interrogation signal, the tag unit including a power source, wherein the tag unit includes a memory, the memory storing an indication of time related to the installation or manufacture of the power source, wherein the tag unit transmits the indication to the hand held unit, wherein the hand held unit determines an amount of remaining power source life associated with the tag unit using the indication, and wherein the hand held unit displays the amount of remaining power source life.

2. The system of claim 1, wherein the hand held unit is a PDA including a plug-in RF module.

3. The system of claim 1, wherein the indication is an approximate time of manufacture of the tag unit.

4. The system of claim 1, wherein the indication is transmitted each time in response to the interrogation signal.

5. The system of claim 1, wherein the indication is stored on the hand held unit, and the hand held unit provides a notification when the power source is expected to expire based upon the indication.

6. The system of claim 5, wherein the notification is provided in response to a difference between the indication and current time.

7. The system of claim 1, further comprising:
   a central computer in communication with the hand held unit wherein the indication is provided from the hand held unit to the central computer, and the central computer provides a notification when the power source is expected to expire based upon the indication.

8. A method of locating an article, the method comprising;
   providing an interrogation signal with a hand held computer equipped with an RF interface;
   providing a response to the interrogation signal with a tag unit associated with the article, wherein the response includes information related to a time of manufacture or installation of a power source in the tag unit;
   displaying on the hand held computer an indication of the presence of the article in response to the providing a response step,
   determining an amount of remaining power source life associated with the tag unit; and
   displaying on the hand held computer an indication of the amount of remaining power source life associated with the tag unit.

9. The method of claim 8, wherein the RF interface is a transceiver card module.

10. A locator system, comprising:
    a hand held unit for providing an interrogation signal, the interrogation signal including a particular department identifier, the hand held unit capable of polling an area; and
    a plurality of tag units, each tag unit for responding to the interrogation signal, each tag unit including a memory storing an identification of the tag unit and a department identifier, wherein the hand held unit polls the tag units in the area having a particular department identifier, the particular department identifier being selectable on the hand held unit, wherein only the tag units having the particular department identifier respond, and wherein the tag unit only responds once to each interrogation signal, wherein the tag unit responds with power source data associated with a power source for the tag unit, wherein the hand held unit displays an amount of vower source life determined using the power source data, the power source data being related to an installation or manufacture of the power source.

11. The locator system of claim 10, wherein the hand held unit displays an indication of the identification for each tag unit having the particular department identifier.

12. The locator system of claim 10, wherein the hand held unit downloads an indication of the identification for each tag unit having the particular department identifier to a central database.

13. A locator system, comprising:
  a hand held unit for providing an interrogation signal, the hand held unit capable of polling an area, the hand held unit also including a database configured to store ids associated with an area;
  a plurality of tag units, each tag unit for responding to the interrogation signal, each tag unit including a memory storing an identification of the tag; and
  an area tag associated with the area, the area tag providing an id associated with the area in response to the interrogation signal, wherein the hand held unit determines the area of the tag unit using the id provided by the area tag and the database, wherein the tag unit responds with power source data associated with a power source for the tag unit, wherein the hand held unit displays an amount of power source life determined using the power source data, the power source data being related to an installation or manufacture of the power source.

14. The system of claim 13, wherein the area tag is powered by a non-battery source.

15. The system of claim 13 wherein each tag unit includes a memory having a department identifier, wherein the hand held unit polls the tag units in the area having a particular department identifier, the particular department identifier being selectable on the hand held unit, wherein the area tag and only the tag units having the particular department identifier respond and the band held computer associates the responding tag units with the area.

16. The system of claim 13, wherein the area is selectable from a pull down menu on the hand held unit.

17. A locator system, comprising:
  a hand held unit for providing an interrogation signal; and
  a tag unit for responding to the interrogation signal with a tag signal, the tag signal including data corresponding to a manufacture time or installation time of a power source for the tag unit the hand held unit displaying an indicator of signal strength for the tag signal, wherein the hand held unit determines an amount of remaining power source life associated with the tag unit using the data, and wherein the hand held unit displays the amount of remaining power source life.

18. The locator system of claim 17, wherein the hand held unit includes a directional antenna, the hand held unit being pointed to a direction, the user capable of using the indicator to determine location of the tag unit.

19. The locator system of claim 17, wherein the hand held unit is comprised of a hand held computer and an RF interface card.

20. The locator system of claim 17, wherein the indicator of signal strength is a bar graph.

21. In a locator system for use with a hand held unit for providing an interrogation signal, the hand held unit including a graphical user interface including a selection for a power level of the interrogation signal, and a tag unit for responding to the interrogation signal, the tag unit comprising:
  a transmit circuit for providing power source data to the handheld unit, the power source data indicating a time of manufacture or installation of a power source for the tag unit.

* * * * *

UNITED STATES PATENT AND TRADEMARK OFFICE
CERTIFICATE OF CORRECTION

PATENT NO. : 7,274,294 B2 Page 1 of 1
APPLICATION NO. : 11/043714
DATED : September 25, 2007
INVENTOR(S) : Eric T. Heinze, Gregg J. Haensgen and Christopher M. Hofmeister It is certified that error appears in the above-identified patent and that said Letters Patent is hereby corrected as shown below:

Column 13:
line 3, replace "vower" with --power--.

Column 14:
line 11, insert --,-- after the words "tag unit".

Signed and Sealed this

Sixth Day of October, 2009

David J. Kappos
*Director of the United States Patent and Trademark Office*